US011010992B2

(12) United States Patent
Rockwell et al.

(10) Patent No.: US 11,010,992 B2
(45) Date of Patent: May 18, 2021

(54) IN-VEHICLE SURVEYS FOR DIAGNOSTIC CODE INTERPRETATION

(71) Applicant: FORD GLOBAL TECHNOLOGIES, LLC, Dearborn, MI (US)

(72) Inventors: Mark Anthony Rockwell, Royal Oak, MI (US); Benjamin M. Rocci, Ann Arbor, MI (US); Christian Krozal, South Lyon, MI (US); David Randolph Roberts, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 15/948,108

(22) Filed: Apr. 9, 2018

(65) Prior Publication Data
US 2019/0311557 A1    Oct. 10, 2019

(51) Int. Cl.
*G07C 5/08* (2006.01)
*G07C 5/00* (2006.01)
*G06Q 30/02* (2012.01)
*H04L 29/08* (2006.01)

(52) U.S. Cl.
CPC ....... *G07C 5/0808* (2013.01); *G06Q 30/0203* (2013.01); *G07C 5/008* (2013.01); *H04L 67/12* (2013.01)

(58) Field of Classification Search
CPC .. G07C 5/0808; G07C 5/008; G06Q 30/0203; H04L 67/12
USPC ........................................................ 701/29.3
See application file for complete search history.

(56) References Cited

U.S. PATENT DOCUMENTS

| 6,141,608 A * | 10/2000 | Rother ................ G01M 17/007 701/29.1 |
| 8,583,318 B2 * | 11/2013 | Ross ...................... G07C 5/008 701/31.5 |
| 8,837,256 B2 * | 9/2014 | Smith ...................... G01V 1/22 367/76 |
| 8,996,230 B2 | 3/2015 | Lorenz et al. |
| 9,002,554 B2 | 4/2015 | Chen |
| 9,208,132 B2 * | 12/2015 | DeBlois ................ G06F 40/109 |
| 2005/0187680 A1 * | 8/2005 | Kamdar ................ G07C 5/008 701/31.4 |
| 2008/0140281 A1 | 6/2008 | Morris et al. |

(Continued)

FOREIGN PATENT DOCUMENTS

| CN | 106462156 A * | 2/2017 | .......... G06Q 10/103 |
| KR | 20140021137 A * | 2/2014 | |

OTHER PUBLICATIONS

Jheng-Syu et al., "The Implementation of OBD-II Vehicle Diagnosis System Integrated with Cloud Computation Technology," 2013, Publisher: IEEE.*

(Continued)

*Primary Examiner* — Tuan C To
(74) *Attorney, Agent, or Firm* — Michael J. Spenner; Brooks Kushman P.C.

(57) ABSTRACT

A system includes a memory storing diagnostic data and survey requirements indicating a survey question and vehicles to receive the survey question. A processor is programmed to identify vehicles that match the survey requirements, send a survey question for the identified vehicles to be answered by vehicle occupants, receive answer to the question from the vehicles, and annotate the diagnostic data with to the answer.

22 Claims, 4 Drawing Sheets

(56) References Cited

U.S. PATENT DOCUMENTS

| | | | |
|---|---|---|---|
| 2009/0306967 A1* | 12/2009 | Nicolov | G06F 40/30 704/9 |
| 2010/0217478 A1* | 8/2010 | Zhang | G07C 5/006 701/31.4 |
| 2011/0250933 A1* | 10/2011 | Wuergler | H04M 1/271 455/569.2 |
| 2013/0317694 A1* | 11/2013 | Merg | G07C 5/008 701/31.6 |
| 2014/0032422 A1* | 1/2014 | Jones | G06Q 10/06 705/304 |
| 2014/0258044 A1* | 9/2014 | Chrzan | G06Q 30/0205 705/26.64 |
| 2016/0085864 A1* | 3/2016 | Morimoto | G06F 16/24575 707/769 |
| 2016/0155076 A1* | 6/2016 | Fix | G06Q 10/06395 705/7.39 |
| 2017/0004260 A1* | 1/2017 | Moturu | G16H 50/20 |
| 2017/0109222 A1 | 4/2017 | Singh et al. | |
| 2018/0174221 A1* | 6/2018 | Merg | G06Q 30/0633 |
| 2018/0247277 A1* | 8/2018 | Livernois | G06Q 10/20 |
| 2018/0357148 A1* | 12/2018 | Baer | G06N 20/00 |

OTHER PUBLICATIONS

Mark et al., "Vehicle Embedded Health Monitoring and Diagnostic System," 2009, Publisher: IEEE.*

\* cited by examiner

IN-VEHICLE SURVEYS FOR DIAGNOSTIC CODE INTERPRETATION

TECHNICAL FIELD

Aspects of the disclosure generally relate to in-vehicle surveys that are provided to users to aid in interpretation of vehicle diagnostic codes.

BACKGROUND

Automobile diagnostic data, such as Diagnostic Trouble Codes (DTCs), form compact, informative messages. Diagnostic data was designed to allow vehicle controllers to indicate a system fault and/or a need for repair. Although the DTC is in 'Active' or 'Confirmed' status for the key cycle in which the fault occurred, most DTCs then revert to a 'History' or 'Aging' status for a number of key cycles so that evidence of the fault will still be available, even if the vehicle is inspected by a technician weeks after the fault.

SUMMARY

In one or more illustrative examples, a system includes a memory storing diagnostic data and survey requirements indicating a survey question and vehicles to receive the survey question; and a processor programmed to identify vehicles that match the survey requirements, send a survey question for the identified vehicles to be answered by vehicle occupants, receive an answer to the question from the vehicles, and annotate the diagnostic data with the answer.

In one or more illustrative examples, a method includes sending diagnostic data, including a diagnostic code, to a server; receiving a survey from the server, including a predefined survey question, requesting an answer explaining circumstances surrounding occurrence of the diagnostic code; and sending the information to the server to annotate the occurrence of the diagnostic code.

In one or more illustrative examples, a non-transitory computer-readable medium comprising instructions that, when executed by a processor, cause the processor to identify vehicles that match the survey requirements indicating a survey question and vehicles to receive the survey question; send a survey question to the identified vehicles to be answered by vehicle occupants; receive an answer to the question from the vehicles; and annotate the diagnostic data with the answer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Diagnostic codes present on vehicles in the field can be difficult for engineers to interpret. This may be because trouble codes can often represent multiple failure modes or can occur sometimes in the absence of a true, customer-noticeable failure. Further, some diagnostic codes can also be caused by the way the customer interacts with the vehicle. An example could be a diagnostic code relating to a failed attempt to close an automated tailgate. In this case, it is difficult for an engineer to know, without further context, whether the tailgate failed to close due to a system failure or an obstruction caused by the customer.

A vehicle data server can be utilized to allow engineers to configure brief surveys to be sent to customers in-vehicle upon the occurrence of a diagnostic code. This enables engineers to identify diagnostic codes that they would like to gather context on and create surveys aimed at generating this feedback. In some systems, diagnostic codes are sent to the vehicle data server when they occur in the field. As an improvement, when the vehicle data server receives a diagnostic code, the vehicle data server may check to see if there is a survey configured for that diagnostic code. If yes, the vehicle data server may send the survey to the vehicle where it will be prompted to the occupant at an appropriate time (such as when the vehicle is not in motion).

The vehicle data server may also be configured by engineers to send surveys to vehicles that have reported a certain diagnostic code in the past. In this case, rather than the instantaneous feedback loop described above, the survey is configured such that after being submitted to the request portal, the vehicle data server searches for vehicles which have reported this diagnostic code in the past X number of days (where X may be configurable) and sends the survey to these vehicles.

An approach utilizing both the 'instantaneous' and 'history' methods may also be utilized by engineers via the vehicle data server. This may be done to solicit feedback or context on diagnostic code occurrences from customers in the field, at code occurrence, or for previously-occurred diagnostic codes.

Figure 1:
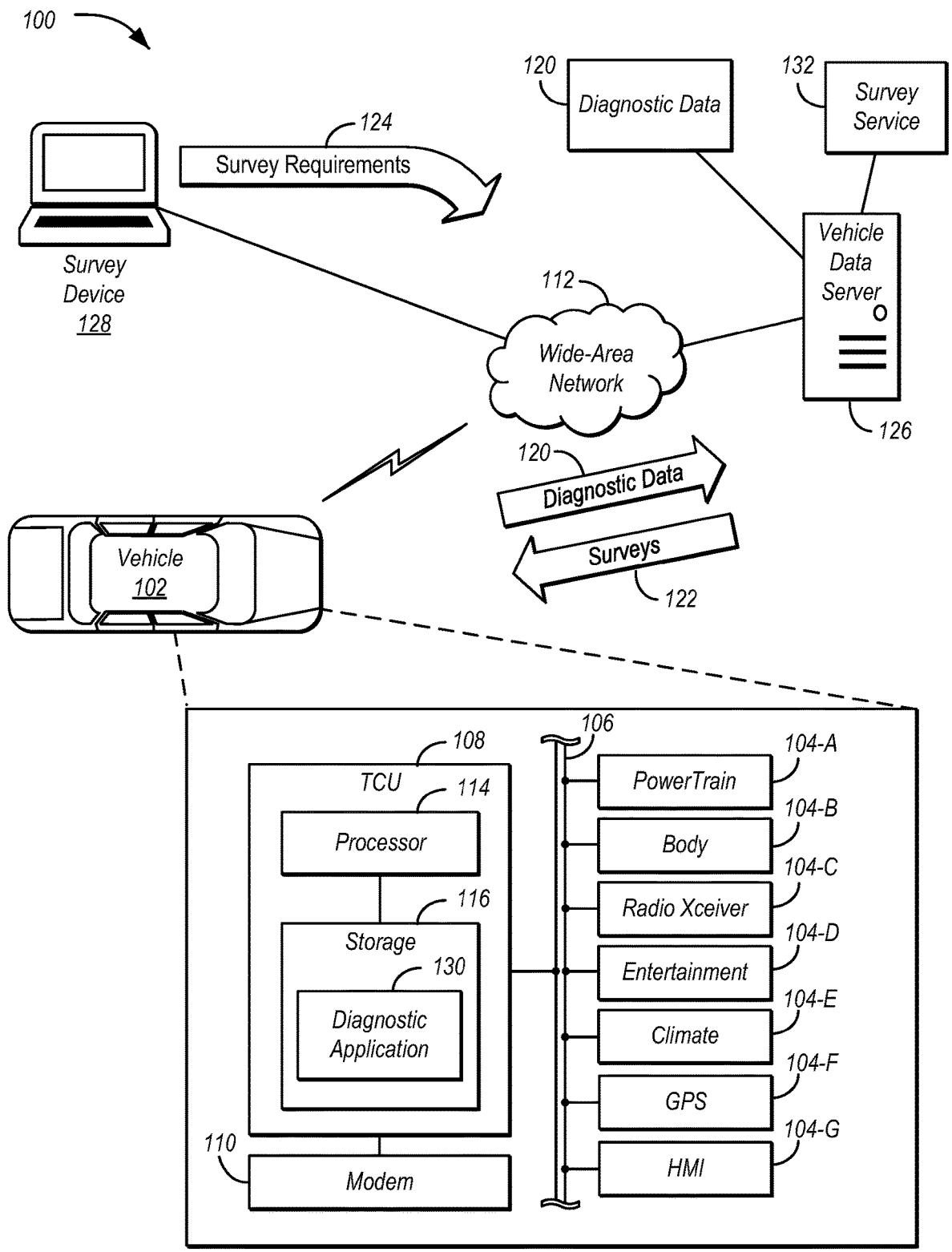
FIG. 1 illustrates an example system implementing in-vehicle surveys for the understanding of diagnostic data.

FIG. 1 illustrates an example system 100 implementing in-vehicle surveys for the understanding of diagnostic data 120. As illustrated, a vehicle 102 includes a plurality of vehicle controllers 104 in communication over one or more vehicle buses 106. The system 100 also includes a vehicle data server 126 configured to maintain diagnostic data 120 received from various vehicles 102. The vehicle 102 further includes a telematics control unit (TCU) 108 configured to send diagnostic data 120, including diagnostic information, to the vehicle data server 126. The TCU 108 may utilize a diagnostic application 130 installed to the TCU 108 to send a regular cadence of diagnostic data 120 as well as to send triggered diagnostic data 120 responsive to trigger criteria having been met. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle electronic control units (ECUs) 104, as well as between the TCU 108 and the vehicle ECUs 104. As some non-limiting examples, the vehicle bus 106 may include one or more of a vehicle controller area network (CAN), an Ethernet network, and a media oriented system transfer (MOST) network. Further aspects of the layout and number of vehicle buses 106 are discussed in further detail below.

The TCU 108 may include network hardware configured to facilitate communication between the vehicle ECUs 104 and with other devices of the system 100. For example, the TCU 108 may include or otherwise access a cellular modem 110 configured to facilitate communication with a wide-area network 112. The wide-area network 112 may include one or more interconnected communication networks such as the Internet, a cable television distribution network, a satellite link network, a local area network, a wide-area network, and a telephone network, as some non-limiting examples. As another example, the TCU 108 may utilize one or more of BLUETOOTH, Wi-Fi, or wired USB network connectivity to facilitate communication with the wide-area network 112 via the user's mobile device.

The TCU 108 may further include various types of computing apparatus in support of performance of the functions of the TCU 108 described herein. In an example, the TCU 108 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, a processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of DTC data and/or other vehicle information from the vehicle ECUs 104 connected to the one or more vehicles buses 106. This collected information may be referred to as diagnostic data 120. The TCU 108 may store the collected diagnostic data 120 to the storage 116 of the TCU 108 or, in other examples, to other storage in communication with the TCU 108. The vehicle information retrieved by the TCU 108 may include, as some non-limiting examples, accelerator pedal position, steering wheel angle, vehicle speed, vehicle location (e.g., GPS coordinates, etc.), vehicle unique identifier (e.g., VIN), engine revolutions per minute (RPM), and vehicle HMI information, such as steering wheel button press information. Thus, diagnostic data 120 may include collected DTC information and/or other vehicle information stored to the storage 116 of the TCU 108.

In some instances, it may not be clear what condition is being indicated by the diagnostic data 120. For example, a diagnostic code in the diagnostic data 120 can often represent multiple failure modes or can occur sometimes in the absence of a true, customer-noticeable failure. Further, some diagnostic data 120 can also be caused by the way the customer interacts with the vehicle. An example could be diagnostic data 120 relating to a failed attempt to close an automated tailgate. In this case, it is impossible for an engineer to know, without further context, whether the tailgate failed to close due to a system failure or an obstruction caused by the customer. As another example, there may be a fault code in the diagnostic data 120 for a 120 Volt AC plug. In some circumstances, the fault code may indicate a failure of the outlet itself (such as an intermittent wire). In other cases, the failure may be a result of how the customer is using the plug, for example, by pulling current in excess of a maximum allowable amount. The diagnostic data may also include further information that identifies the vehicle, such as a vehicle identification number (VIN) or other identifier.

A survey 122 may be used to gather additional information regarding the occurrence of a fault code in the diagnostic data 120. The survey 122 may include one or more questions that relate to a diagnostic code, which may be answered by the vehicle driver or other vehicle occupant.

Survey requirements 124 may be used to define the questions and diagnostic codes of the surveys 122. The survey requirements 124 may further specify attributes of the vehicles 102 that should receive the questions. In an example, these attributes may include one or more of: a make of a vehicle 102, a model of a vehicle 102, a model year of a vehicle 102, a vehicle identification number (VIN) of a vehicle 102, or a VIN range of vehicle 102.

The vehicle data server 126 and a survey device 128 may each include various types of computing apparatus, such as a computer workstation, a server, a desktop computer, a virtual server instance executed by a mainframe server, or some other computing system and/or device. Similar to the TCU 108, the vehicle data server 126 and the survey device 128 generally include a memory on which computer-executable instructions may be maintained, where the instructions may be executable by one or more processors (not shown for clarity). Such instructions and other data may be stored using a variety of computer-readable media. In an example, the vehicle data server 126 may be configured to maintain the diagnostic data 120 received from the TCU 108 of the vehicles 102 by way of the network 112.

The diagnostic application 130 may be one application included on the storage 116 of the TCU 108. The diagnostic application 130 may include instructions that, when executed by the processor 114 of the TCU 108, cause the TCU 108 to periodically collect the diagnostic data 120 information from the controllers 104 (e.g., including DTC information), store the information for transmission, and transmit the diagnostic data 120 to the vehicle data server 126 over the wide-area network 112. The diagnostic application 130 may also include instructions for performing functions in response to receipt of surveys 122 from the vehicle data server 126.

A survey service 132 may be one application included on the storage of the vehicle data server 126. The survey service 132 may include instructions that, when executed by the processor of the vehicle data server 126, cause the vehicle data server 126 to receive the diagnostic data 120 information from vehicles 102, receive survey requirements 124 from the survey device 128, and provide surveys 122 to the vehicles 102 to aid in the understanding of the diagnostic data 120.

The survey device 128 may be used to allow an operator to configure the survey requirements 124. In an example, a user of the survey device 128 may specify a diagnostic code to understand, as well as one or more questions that relate to the diagnostic code. The user may also specify whether the survey requirements 124 indicate a survey 122 to be given real-time when a diagnostic code is identified, or a survey 122 to be given for historical diagnostic codes. For historical surveys 122, the user may also specify what vehicles are intended to receive the survey 122 (e.g., make, model, VIN range, etc.).

Figure 2:
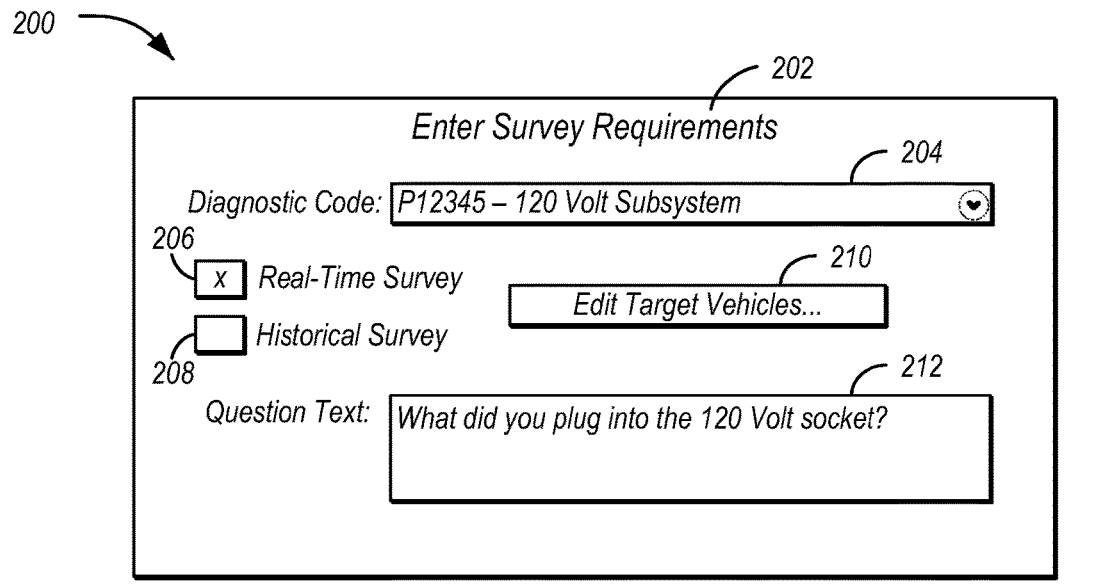
FIG. 2 illustrates an example of a user interface of the survey device for entering survey requirements.

FIG. 2 illustrates an example of a user interface 200 of the survey device 128 for entering survey requirements 124. In an example, the user interface 200 may be a web page rendered by a web browser of the survey device 128, e.g., by the survey service 132. In another example, the survey device 128 may execute a client application configured to communicate over the wide-area network 112 with the survey service 132.

As shown, the user interface 200 includes a label 202 indicating the user interface 200 is for entering of survey requirements 124. The user interface 200 also includes a diagnostic code control 204 from which a user may select a diagnostic code for the survey 122. The example diagnostic code control 204 is a dropdown list, but other controls may be used from which one or more diagnostic codes can be entered or selected.

A real-time survey control 206 may be included in the user interface 200 to receive selection of whether or not the survey is intended to be presented real-time when the diagnostic code is issued. As shown, the real-time survey control 206 is a checkbox, but this is merely an example. (If the DTC occurs while the vehicle 102 is in motion, presentation of the real-time survey 122 may be delayed until the vehicle 102 is no longer in motion.)

A historical survey control 208 may be included in the user interface 200 to receive selection of whether or not the survey is intended to be presented for historical diagnostic codes received and stored in the diagnostic data 120 maintained by the vehicle data server 126. As shown, the historical survey control 208 is a checkbox, but this is merely an example.

An edit target vehicles control 210 may be selected to receive selection of criteria for vehicles 102 to receive the survey 122. As some possibilities, the criteria may be that all vehicles 102 having experienced the diagnostic code should be asked to respond to the survey 122, that only vehicles 102 of a certain make and model should be asked to respond to the survey 122, and/or that only vehicles 102 with certain VINs or a range of VINs should respond to the survey 122.

The user interface 200 also includes a question control 212 that may be used to receive text or other information to be presented to the user or occupant of the vehicle 102. As shown, the question control 212 is a text control configured to receive textual data, however other examples are possible, such as controls in which image data may be additionally or alternately included. Moreover, in some examples, the user interface 200 may allow the user to provide more than one question to be answered.

Figure 3:
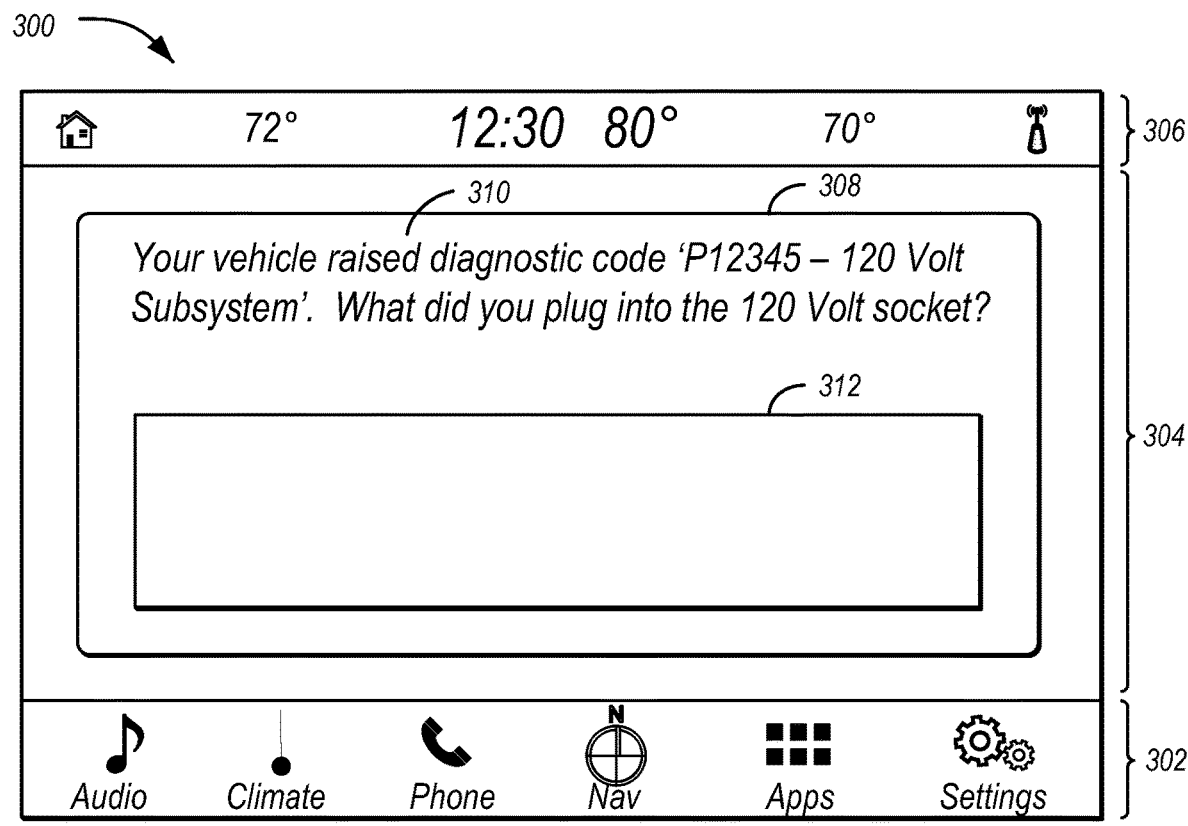
FIG. 3 illustrates an example of the vehicle displaying a user interface for responding to a survey.

FIG. 3 illustrates an example of the vehicle 102 displaying a user interface 300 for responding to a survey 122. In an example, the user interface 300 may be displayed by the entertainment controller 104-D to a head unit or other display of the vehicle 102, e.g., based on instruction from the diagnostic application 130.

As shown, the user interface 300 includes a category listing 302 of one or more screens of content to be displayed in a main screen area 304 of a head unit display. As some examples, the category listing 302 may include an audio screen from which configuration of vehicle 102 audio settings may be performed, a climate control screen from which vehicle 102 climate control settings may be configured, a phone screen from which calling services may be utilized, a navigation screen from which maps and routing may be performed, an applications screen from which installed applications may be invoked, and a settings screen from which backlighting or other general settings of the head unit display may be accessed. The user interface 300 may also include a general information area 306 from which time, current temperature, and other information may remain visible to the user, regardless of the specific screen or application that is active in the main screen area 304.

When a survey 122 is ready for presentation to a user, the main screen area 304 may show the survey 122 content. Continuing with the example of FIG. 2, to display the survey 122 the user interface 300 includes a survey window 308. The survey window 308 may be displayed responsive to various conditions. For instance, for a real-time survey 122, the survey window 308 may be displayed responsive to occurrence of the diagnostic code, subject to delay until the vehicle 102 is no longer in a drive mode if the diagnostic code occurs while the vehicle 102 is moving. Or, for a historical survey 122, the survey window 308 may be displayed responsive to receipt of the historical survey 122 from the vehicle data server 126.

The survey content window 308 includes a question label 310 that indicates the diagnostic code that was raised as well as the question being asked. The survey content window 308 also includes an answer control 312 into which the user may place the answer to the question. Once the user has answered the question, the text of the answer may be sent by the vehicle 102 back to the vehicle data server 126. The collected answers may, accordingly, be compiled and used to better understand the meaning of the diagnostic code.

Variations on the user interface 300 are possible. In an example, the user interface 300 may be displayed to a screen of the user's phone or other mobile device. For instance, the survey 122 may be sent to the vehicle 102 and, from the vehicle 102, to the user's mobile device. The user may then respond to the survey using the mobile device, which may send the answers to the vehicle data server 126, or to the vehicle 102 to provide to the vehicle data server 126. As another variation, the survey 122 may be sent from the vehicle data server 126 to the mobile device and presented on the mobile device, which may send the answers to the vehicle data server 126. Notably, by sending the surveys 122 to the user's mobile device, the user may be able to answer the survey 122 at the user's convenience, such as when the user is no longer in the vehicle 102.

Figure 4:
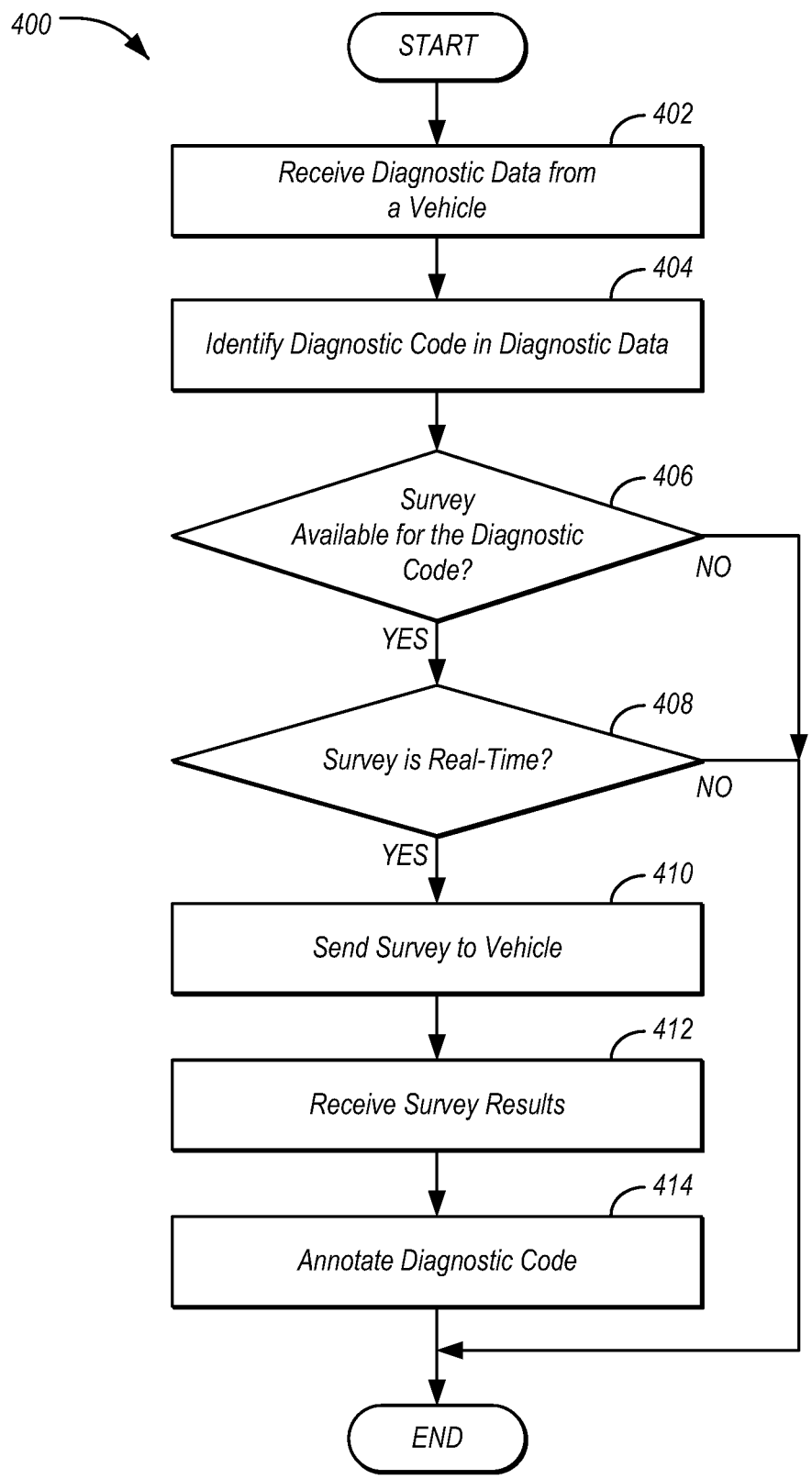
FIG. 4 illustrates an example process for performing real-time annotation of diagnostic codes.

FIG. 4 illustrates an example process 400 for performing real-time annotation of diagnostic codes. In an example, the process 400 may be performed by the vehicle data server 126 of the system 100 discussed in detail above.

At operation 402, the vehicle data server 126 receives diagnostic data 120 from the vehicle 102. In an example, the diagnostic application 130 of the vehicle 102 sends the diagnostic data 120 over the wide-area network 112 to the vehicle data server 126, and the vehicle data server 126 receives the diagnostic data 120.

At 404, the vehicle data server 126 identifies a diagnostic code in the diagnostic data 120. In an example, the survey service 132 of the vehicle data server 126 identifies diagnostic codes that were issued in the received diagnostic data 120.

At operation 406, the vehicle data server 126 determines whether a survey is available for the diagnostic code. In an example, the vehicle data server 126 may maintain survey requirements 124 received from the survey device 128. The vehicle data server 126 may identify whether any of the survey requirements 124 are a match to the diagnostic codes in the diagnostic data 120. If so, control passes to operation 408. Otherwise, the process 400 ends.

The vehicle data server 126 determines, at 408, whether the survey requirements 124 specify a real-time survey. If so, control passes to operation 410. Otherwise, the process 400 ends.

At operation 410, the vehicle data server 126 sends the survey 122 specified by the survey requirements 124 to the vehicle 102. In an example, the vehicle data server 126 sends a message including the survey 122 over wide-area network 112 to be received by the modem 110 and TCU 108 of the vehicle 102. In another example, vehicle data server 126 sends the survey 122 to be received by a mobile device associated with the vehicle 102 (e.g., according to account information stored to or accessible to the vehicle data server 126).

At 412, the vehicle data server 126 receives results of the survey 122 from the vehicle 102. In an example, responsive to receipt of the survey 122, the diagnostic application 130 causes the vehicle 102 to present the survey 122 to one or more vehicle occupants. An example user interface 300 presentation of a survey 122 is shown with regard to FIG. 3. The occupant may enter data into the user interface 300 responding to the question or questions presented by the survey 122. These responses may be provided by the diagnostic application 130 back to the vehicle data server 126 over the wide-area network 112. In another example, the survey 122 may be provided to the user's mobile device (e.g., according to account information stored to or accessible to the vehicle data server 126), presented to the user via the mobile device, where the results may be provided from the mobile device back to the vehicle data server 126.

The vehicle data server 126 annotates the diagnostic code of the survey 122 at 414. In an example, the answers to the questions of the survey 122 may be stored at the vehicle data server 126 to aid in further investigation of the diagnostic code. After operation 414, the process 400 ends.

Figure 5:
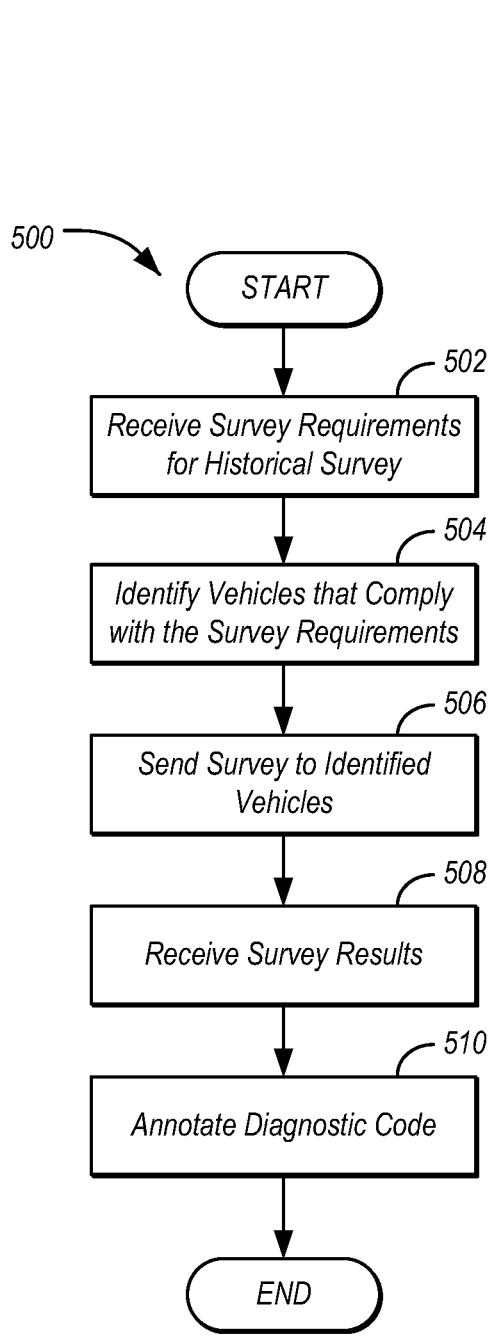
FIG. 5 illustrates an example process for performing annotation of historical diagnostic codes.

FIG. 5 illustrates an example process 500 performing annotation of historical diagnostic codes. In an example, similar to the process 400, the process 500 may be performed by the vehicle data server 126 of the system 100 discussed in detail above.

At 502, the vehicle data server 126 receives a historical diagnostic survey 122. In an example, the vehicle data server 126 receives survey requirements 124 from a survey device 128 specifying a survey 122 to be provided for historical diagnostic codes maintained in the diagnostic data 120 of the vehicle data server 126.

The vehicle data server 126 identifies vehicles 102 that comply with the survey requirements at 504. In an example, the vehicle data server 126 may query the diagnostic data 120 for diagnostic codes indicated by the survey requirements 124, where the vehicles 102 corresponding to the diagnostic codes match the target vehicles 102 specified by the survey requirements 124. The vehicle data server 126 sends the survey 122 to the identified vehicles 102 at 506. In another example, the vehicle data server 126 identifies mobile devices corresponding to the identified vehicles 102 (e.g., according to account information stored to or accessible to the vehicle data server 126), and sends the survey 122 to the identified mobile devices at 506.

At 508, and similar to as discussed above with respect to operation 412, the vehicle data server 126 receives the results of the surveys 122 from the vehicles 102 (or mobile devices). At 510, and similar to as discussed above with respect to operation 414, the vehicle data server 126 annotates the diagnostic code. After operation 510, the process 500 ends.

Figure 6:
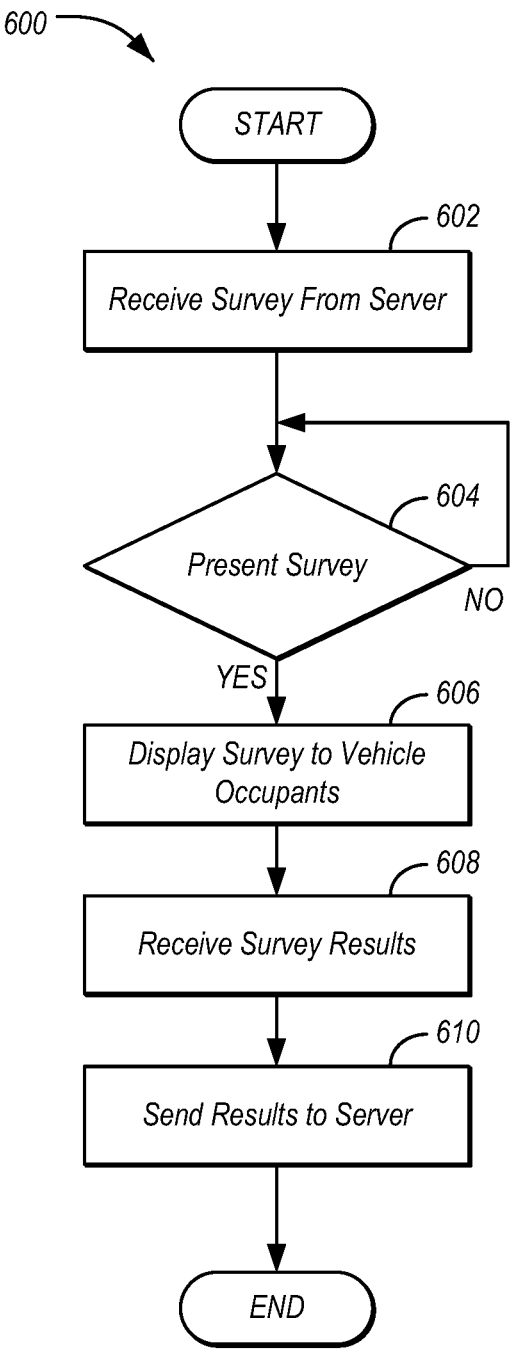
FIG. 6 illustrates an example process for a vehicle performing an in-vehicle survey.

FIG. 6 illustrates an example process 600 for performing an in-vehicle survey 122. In an example, the process 600 may be performed by the vehicle 102 of the system 100 discussed in detail above. While the process 600 is described in terms of the vehicle 102, it should be noted that in other examples, the process 600 may be performed by the user's mobile device.

At 602, the vehicle 102 receives a survey 122 from the vehicle data server 126. The vehicle 102 determines at 604 whether to display the survey 122 to the occupants of the vehicle 102. In an example, the vehicle 102 may delay display of the survey window 308 until the vehicle 102 is not in a drive mode. If the survey 122 can be displayed, control passes to operation 606. Otherwise, control remains at operation 604.

At operation 606, the vehicle 102 displays the survey 122 to the occupants of the vehicle 102. An example user interface 300 presentation of a survey 122 is shown with regard to FIG. 3. At 608, the vehicle 102 receives results of the survey 122. In an example, an occupant may enter data into the user interface 300 responding to the question or questions presented by the survey 122. At 610, the vehicle 102 sends the results to the vehicle data server 126. After operation 610, the process 600 ends.

Computing devices described herein, such as the TCU 108, vehicle data server 126, survey device 128 and the user's mobile device, generally include computer-executable instructions where the instructions may be executable by one or more computing devices such as those listed above. Computer-executable instructions, such as those of the diagnostic application 130 or survey service 132, may be compiled or interpreted from computer programs created using a variety of programming languages and/or technologies, including, without limitation, and either alone or in combination, JAVA, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a memory storing diagnostic data and survey requirements, the survey requirements indicating a survey question and vehicles to receive the survey question, wherein the survey requirements indicate that the survey question is to be delivered responsive to occurrence of a diagnostic code, and the survey question requests information regarding circumstances surrounding the occurrence of the diagnostic code; and
a processor programmed to
identify vehicles that match the survey requirements,
send a survey question for the identified vehicles to be answered by vehicle occupants,
receive answers to the question from the vehicles, and
annotate the diagnostic data with the answers that explain the circumstances surrounding the occurrence of the diagnostic code.

2. The system of claim 1, wherein the survey requirements specify the vehicles as a set of vehicle identification numbers.

3. The system of claim 1, wherein the survey requirements specify the vehicles as a make and model of vehicle.

4. The system of claim 1, wherein the diagnostic data is received over a wide-area network from a plurality of vehicles.

5. The system of claim 1, wherein the answer to the survey question is a textual response received by a vehicle from a vehicle occupant.

6. The system of claim 1, wherein the survey requirements indicate that the survey question is to be delivered real-time responsive to occurrence of a diagnostic code.

7. The system of claim 1, wherein the survey requirements indicate that the survey question is to be delivered to vehicles indicated by the diagnostic data as having experienced a diagnostic code.

8. The system of claim 1, wherein to send a survey question for the identified vehicles includes to send the survey question to a mobile device of a user of the vehicle.

9. A non-transitory computer-readable medium comprising instructions that, when executed by a processor, cause the processor to:
- identify vehicles that match survey requirements indicating a survey question and vehicles to receive the survey question, wherein the survey requirements indicate that the survey question is to be delivered responsive to occurrence of a diagnostic code, and the survey question requests information regarding circumstances surrounding the occurrence of the diagnostic code;
- send a survey question to the identified vehicles to be answered by vehicle occupants;
- receive an answer to the question from the vehicles; and
- annotate diagnostic data with the answer that explains the circumstances surrounding the occurrence of the diagnostic code.

10. The medium of claim 9, wherein the survey requirements specify the vehicles as a set of vehicle identification numbers.

11. The medium of claim 9, wherein the survey requirements specify the vehicles as a make and model of vehicle.

12. The medium of claim 9, wherein the diagnostic data is received over a wide-area network from a plurality of vehicles.

13. The medium of claim 9, wherein the answer to the survey question is a textual response received by a vehicle from a vehicle occupant.

14. The medium of claim 9, wherein the survey requirements indicate that the survey question is to be delivered real-time responsive to occurrence of a diagnostic code.

15. The medium of claim 9, wherein the survey requirements indicate that the survey question is to be delivered to vehicles indicated by the diagnostic data as having experienced a diagnostic code.

16. A method comprising:
- identifying vehicles that match survey requirements indicating a survey question and vehicles to receive the survey question, wherein the survey requirements indicate that the survey question is to be delivered responsive to occurrence of a diagnostic code, and the survey question requests information regarding circumstances surrounding the occurrence of the diagnostic code;
- sending a survey question to the identified vehicles to be answered by vehicle occupants;
- receiving an answer to the question from the vehicles; and
- annotating diagnostic data with the answer that explains the circumstances surrounding the occurrence of the diagnostic code.

17. The method of claim 16, wherein the survey requirements specify the vehicles as a set of vehicle identification numbers.

18. The method of claim 16, wherein the survey requirements specify the vehicles as a make and model of vehicle.

19. The method of claim 16, wherein the diagnostic data is received over a wide-area network from a plurality of vehicles.

20. The method of claim 16, wherein the answer to the survey question is a textual response received by a vehicle from a vehicle occupant.

21. The method of claim 16, wherein the survey requirements indicate that the survey question is to be delivered real-time responsive to occurrence of a diagnostic code.

22. The method of claim 16, wherein the survey requirements indicate that the survey question is to be delivered to vehicles indicated by the diagnostic data as having experienced a diagnostic code.

* * * * *